UNITED STATES PATENT OFFICE.

THOMAS B. JOSEPH, OF SAN FRANCISCO, CALIFORNIA.

METAL-LEACHING PROCESS.

No. 805,017.     Specification of Letters Patent.     Patented Nov. 21, 1905.

Application filed October 6, 1904. Serial No. 227,510.

*To all whom it may concern:*

Be it known that I, THOMAS B. JOSEPH, a citizen of the United States, residing at San Francisco, in the county of San Francisco and State of California, have invented certain new and useful Improvements in Metal-Leaching Processes, of which the following is a specification.

My invention has reference to a metal-leaching process for extracting gold and silver, copper, and nickel from ore containing the same when in a suitable condition.

A special object of my invention is to provide a process for extracting said metals from the ore which can be used on base, oxidized, or other suitable ore, which will not be injuriously affected by the presence of soluble iron, arsenic, tellurium, or sulfur in the ore, and which will leach either roasted or unroasted ore, tailings, or ore-slimes, either in stationary tanks or in revolving cylinders, without waste of cyanid by the action of soluble iron.

It must be understood that I cannot state definitely how fine the ore should be crushed, as loose sand-ore should be leached in its natural state unless the gold therein was coated over with a film of silica, in which case such sand-ore should be pulverized finer to break through the silica films to enable the gold to be exposed to the metal-solvent solution.

Soft ore should not be crushed as fine as hard or base ore, the fineness of crushing depending entirely upon the quality, impenetrability, and hardness of the ore to be leached.

Some of the concentrated pyritic ore if not roasted should be ground to a fine powder of two hundred mesh or finer to the linear inch to get the best and quickest extraction.

In carrying out my invention after the ore has been properly prepared, as aforesaid, I subject the same to the leaching solution, containing water, sodium cyanid, hydrate of calcium, ammonium carbonate, ammonium nitrate, and sodium bicarbonate, together with compressed air, the compressed air being forced upwardly therein from the bottom from an air-compressor, or when leaching the ore in a revolving cylinder the compressed air is added until the desired pressure is contained in the air-tight cylinder, in which the pressure is observed from an air-gage attached thereto.

In carrying out my process it may be used in such vessels or tanks or revolving cylinders as have been found to be the most practical in the metal-leaching methods heretofore used.

If there were no carbon dioxid with the ammonia in this new solution, then the ammonia therein might decompose some of the cyanogen into its component parts and ruin its power to dissolve gold; but the carbon dioxid from the ammonium carbonate protects the cyanogen from such destruction. The cyanogen in this solution dissolves the precious metal, while the ammonium therein causes a better extraction of the silver, as well as of the copper or gold, with this solution than the straight cyanid process would obtain.

If there are any of the ferrocyanid of zinc, the ferrocyanid of copper, the zinc-cyanid, the sulfocyanid, or the ferrocyanids remaining in this solution, any of them are also good solvents of the gold therein, as the compressed air will help to neutralize the injurious parts of sulfur and iron.

The leaching solution, containing water, sodium cyanid, hydrate of calcium, ammonium carbonate, ammonium nitrate, and sodium bicarbonate, is prepared in the storage-tank, or the ammonium carbonate or any one or more of the chemicals might also be dissolved in water and added into the leaching solution while on the leaching ore after the same had been partially leached, if desired.

Many of the injurious salts of iron—arsenic or sulfur—are readily oxidized by this process or transformed into compounds insoluble or inert as to the solution. This metal-solvent solution may be run into the ore several times to give the ore different leachings, if desired, and its upward inflow will generally give better results than the opposite direction.

The compressed air may be conveyed upwardly in the tank of ore being leached in any approved manner for the purpose of agitating the ore, as well as to furnish plenty of oxygen therein to aid the work of the metal solvents in the extraction of the metals from the ore and also to help to neutralize the soluble iron and sulfur or other injurious substances therein, as well as to help to protect the cyanogen, with its carbon dioxid, from the attacks of any soluble iron, or it may be used at the desired pressure on the leaching ore in a revolving cylinder. The compressed air is also very beneficial to aid this solution during the extraction of the metals from ore-slimes when plenty of this solution is used. Great care must be taken, however, not to admit the compressed air under too great a pressure at the start in leaching ordinarily-prepared ore in stationary tanks, as channeling of the ore might result, which would retard the leaching of the ore between the channels. Therefore the compressed air should be turned on slowly and its force be gradually increased to the desired amount. In leaching ore containing copper then more of the carbonate of ammonium should be used accordingly, and when the ore is a sulfid then it might be leached in the revolving cylinder a series of times with this solution after alternately drying and oxidizing the ore therein while the cylinder is revolving with compressed air therein after the solution is removed out of it.

It will sometimes be found to good advantage to first leach the sulfid ore in the revolving cylinder in a hot solution of water containing bicarbonate of sodium and then with the other chemicals of this process. The compressed air is also beneficial to help to convey the slimes, if any, therein to the top to aid the percolation of the solution through the ore, as well as to help to transform some of the said injurious salts of iron—arsenic and sulfur—into the inert condition as to the solution. The compressed air prevents much of the unnecessary consumption of the cyanid and greatly increases the capacity of the mill by keeping the solution warm and from freezing in winter.

As it is expedient not to have any more of the cyanid-destroying compounds in the ore than can easily be helped, it is sometimes advisable to remove the cyanid-destroying compounds, if any therein, by washing the ore with water or with water and compressed air or with lime-water or with lime-water and compressed air before the leaching of the ore is commenced and then to use in the sodium-cyanid solution hydrate of calcium, ammonium carbonate, ammonium nitrate, sodium bicarbonate and compressed air while the ore is being leached of its metals to neutralize any remaining cyanid-destroying compounds.

When it is desired to hasten the process of leaching or to prevent the solution from freezing in winter, the compressed air may be heated with steam or with a heating-furnace through which a coil of the air-pipe passes, or by both methods, if desired.

I wish to be understood as distinguishing between the use of calcium hydrate and oxid of lime, as I lay no claim to the use of oxid of lime for the reason that the dissolving of the latter into the calcium hydrate when drowned in the leaching solution is so slow that the sulfur or arsenic in the ore might injure the cyanid solution or the cyanids of the precious metals before the oxid of lime was dissolved, thus rendering its use of but little or no benefit to neutralize the sulfur or arsenic in the ore until after they had done their harmful work.

Calcium hydrate, compressed air, ammonium carbonate and ammonium nitrate, and sodium bicarbonate in this solution immediately neutralizes the most of the baseness or refractory nature of the ore, and thereby prevents that injury to the cyanid solution. The calcium hydrate will form an insoluble compound with the arsenic if any is exposed on the ore.

As a general rule, there should be used in proportion to one ton of the water of the solution from one-half pound to five pounds alkaline cyanid, but, preferring the sodium cyanid, about one to fifty pounds of ammonium carbonate, about one-half pound of ammonium nitrate, and about enough of the calcium hydrate to contain about one pound of the oxid of lime and about two pounds of sodium bicarbonate before being dissolved in the water, in addition to the compressed air to be used therein while the ore is being leached, which compressed air can also be used in the solvent solution to give the same an aeration before it is run on the ore to be leached, if desired, though I do not limit myself to the exact amounts or proportions of the chemicals to be used to the ton of water nor to the exact steps in the manner or mode of obtaining or mixing or using of the stronger or weaker solution, as a different proportion of the chemicals therein will be found beneficial on some ores, as circumstances may require, for with but little gold in the ore then a lesser amount of sodium cyanid need be used, and the more copper therein then more ammonium carbonate should be used. The addition of these chemicals thereto and the compressed air assist the leaching to such a degree that a less amount of the sodium cyanid can be used than heretofore has been the custom on some ores, even where any dust of the oxid of lime or dry-slaked lime has been added or scattered into the ore when the same was dumped into the tank to be leached in order to sweeten the same to prevent any bad odor that might afterward occur when taking out the tailings.

It must be understood that no hard or fast rules will be applied, and that different conditions of ore must be considered in the successful work of this process.

When desiring to finish the leaching of a tank of ore, a wash-water should be run through it to wash out as much as is convenient of the remaining solution of the metals as may have remained therein and be saved to again be used as a wash-water or as a leaching solution, as desired, or for a part of it to be used to replenish to the normal quantity the stock solution, if wished, which latter should also have the strength of its chemicals replenished from time to time, as desired, to additionally leach the same or future ore. In this way the wash-water may be used over and over again as a wash-water as often as wished to wash the same or other ore by having its quantity increased after the metals are precipitated therefrom, as desired, the pipes connecting the different tanks, pumps, and air-compressor, being provided with stop-cocks to control and regulate the flow of the different solutions and also the compressed air.

In some cases it might be found advantageous to run this metal solvent solution through a quantity of crushed limestone to more purify the solution by the absorption of the impurities into the limestone of one-half-inch cubes, if desired.

To extract precious metals from powdered ores containing tellurium or arsenic or bismuth with this process, it will sometimes be found advantageous to first separate the arsenic or tellurium or bismuth therefrom by agitating the ore with compressed air or machine-stirring, or both, in a solution of water containing ferrous chlorid and overflowing them away from the ore to be leached instead of roasting out those injurious elements, which process is another one of my invention.

When this process solution has been used to extract metals from ore-slime, one could afterward use salt water of a greater specific gravity to displace this metal solvent containing the dissolved metals therefrom or pass the solvent and slimes without filtering through quicksilver containing sodium amalgam to take out the precious metal, as desired, and then through a swift running centrifugal mill to separate the slime-tailings from the solution either before or after running it through the sodium amalgam, if desired.

If at any time the precipitation of the precious metal is not quite as good as desired, it might be found advantageous to add more sodium cyanid or caustic soda or sodium sulfid, or both, or more of the hydrate of calcium or sodium bicarbonate to the ton of the metal solvent before trying to precipitate the metals therefrom to aid their precipitation.

The copper or nickel can be precipitated by electricity or by steaming out the ammonia or by any suitable means. The gold and silver may be precipitated by electricity or by filtering the metalline solution through spongy metals or metal shavings or finely-divided zinc or zinc-shavings or by agitating the metalline solution with compressed air, while adding zinc-dust or by any finely-divided metals therein more electropositive than the gold or silver in the ammoniacal cyanid solution. However, I have no claim as to any special mode or means by which the metals to be saved shall be precipitated from this metal's solvent solution.

Sometimes after leaching the copper pyrites in the air-tight revolving cylinder and drawing off the solution it will be found of advantage to heat the partly-leached ore in the revolving cylinder to a temperature of a little over 300° Fahrenheit by means of hot steam forced into it while the cylinder is revolving until the steam-gage attached to the cylinder shows nearly or about one hundred pounds pressure of steam within the cylinder in order to separate as much as is convenient in that manner of the sulfur or arsenic, or both, from the ore and let the same escape with the steam therefrom, when desired, through an opened pipe conveyance either out of the mill or into some other receptacle, to be saved for other purposes, as desired. This work might be called roasting the ore with very hot steam and might be performed one or more times after alternately leaching the same. Most ores by a small amount of steam or hot-air heating while leaching in the cylinder will be greatly aided in their being properly leached.

I lay no claim to the apparatus, nor do I claim, broadly, the use of compressed air, nor do I claim any particular mode of precipitating the metals from this solution, nor do I claim any particular source from which the elements in the solution are prepared or obtained, to be used in this process, as it may be obtained from any well-known non-injurious practical source; but, What I do claim as new, and desire to secure by Letters Patent of the United States, is—

1. The herein-described process of extracting metals such as gold, silver, copper and nickel from ores containing the same when in a suitable condition, which consists in subjecting the said ore to the leaching action of a solution containing water, sodium cyanid and ammonium carbonate, the carbonate being in excess of the cyanid, and precipitating the metals from the solution by any well-known method, substantially as described.

2. The herein-described process of extracting metals such as gold, silver, copper, and nickel from ores containing the same when in a suitable condition, which consists in subjecting the said ore to the leaching action of a solution containing water, sodium cyanid, and ammonium carbonate, the carbonate being in excess of the cyanid together with compressed air and precipitating the metals from the solution by any well-known method, substantially as described.

3. The herein-described process of extracting metals such as gold, silver, copper and nickel from ores containing the same when in a suitable condition, which consists in subjecting the said ore to the leaching action of a solution containing water, sodium cyanid, ammonium carbonate and ammonium nitrate, and precipitating the metals from the solution by any well-known method, substantially as described.

4. The herein-described process of extracting metals such as gold, silver, copper and nickel from ores containing the same when in a suitable condition, which consists in subjecting the said ore to the leaching action of a solution containing water, sodium cyanid, ammonium carbonate, and ammonium nitrate, together with compressed air and precipitating the metals from the solution by any well-known method, substantially as described.

5. The herein-described process of extracting metals such as gold, silver, copper and nickel from ores containing the same when in a suitable condition, which consists in subjecting the said ore to the leaching action of a solution containing water, sodium cyanid, ammonium carbonate, ammonium nitrate, and calcium hydrate and precipitating the metals from the solution by any well-known method, substantially as described.

6. The herein-described process of extracting metals such as gold, silver, copper and nickel from ores containing the same when in a suitable condition, which consists in subjecting the said ore to the leaching action of a solution containing water, sodium cyanid, ammonium carbonate, ammonium nitrate, and calcium hydrate, together with compressed air and precipitating the metals from the solution by any well-known method, substantially as described.

7. The herein-described process of extracting metals such as gold, silver, copper and nickel from ores containing the same when in a suitable condition, which consists in subjecting the said ore to the leaching action of a solution containing water, sodium cyanid, ammonium carbonate, ammonium nitrate, hydrate of calcium, and sodium bicarbonate and precipitating the metals from the solution by any well-known method, substantially as described.

8. The herein-described process of extracting metals such as gold, silver, copper and nickel from ores containing the same when in a suitable condition, which consists in subjecting the said ore to the leaching action of a solution containing water, sodium cyanid, ammonium carbonate, ammonium nitrate, calcium hydrate, and sodium bicarbonate together with compressed air, substantially as described.

In witness whereof I have hereunto set my hand in the presence of two subscribing witnesses.

THOMAS B. JOSEPH.

Witnesses:
FRANCIS M. WRIGHT,
BESSIE GORFINKEL.